United States Patent
Novotny

(10) Patent No.: US 7,715,077 B2
(45) Date of Patent: May 11, 2010

(54) MICRO MIRRORS HAVING A MIRROR PLATE WITH INTERDIGITATED ARMS

(75) Inventor: Vlad Novotny, Los Gatos, CA (US)

(73) Assignee: Spatial Photonics, Inc., Sunnyvale, CA (US)

( * ) Notice: Subject to any disclaimer, the term of this patent is extended or adjusted under 35 U.S.C. 154(b) by 186 days.

(21) Appl. No.: 12/128,258

(22) Filed: May 28, 2008

(65) Prior Publication Data

US 2009/0296182 A1 Dec. 3, 2009

(51) Int. Cl.
*G02B 26/08* (2006.01)

(52) U.S. Cl. .............. 359/200.6; 359/198.1; 359/225.1; 359/298

(58) Field of Classification Search ................... None
See application file for complete search history.

(56) References Cited

U.S. PATENT DOCUMENTS

| 6,914,711 | B2 | 7/2005 | Novotny et al. |
| 7,071,109 | B2 | 7/2006 | Novotny et al. |
| 7,375,874 | B1 | 5/2008 | Novotny et al. |
| 2006/0187523 | A1* | 8/2006 | Pan ............................ 359/291 |
| 2008/0144155 | A1* | 6/2008 | Pan ............................ 359/225 |

* cited by examiner

*Primary Examiner*—James Phan
(74) *Attorney, Agent, or Firm*—Fish & Richardson P.C.

(57) ABSTRACT

A micro mirror device includes a first hinge supported by a substrate, a mirror plate tiltable around the first hinge and having a first set of arms facing the substrate, and a second set of arms on the substrate. The first set of arms and the second set of arms can be interdigitated when the mirror plate is tilted. The micro mirror device includes a first lateral guard on the substrate (or the mirror plate). The first lateral guard can limit movement of the mirror plate to a position in a first direction substantially parallel to an upper surface of the substrate to prevent the first set of arms from contacting the second set of arms when the arms are in the interdigitated position.

33 Claims, 8 Drawing Sheets

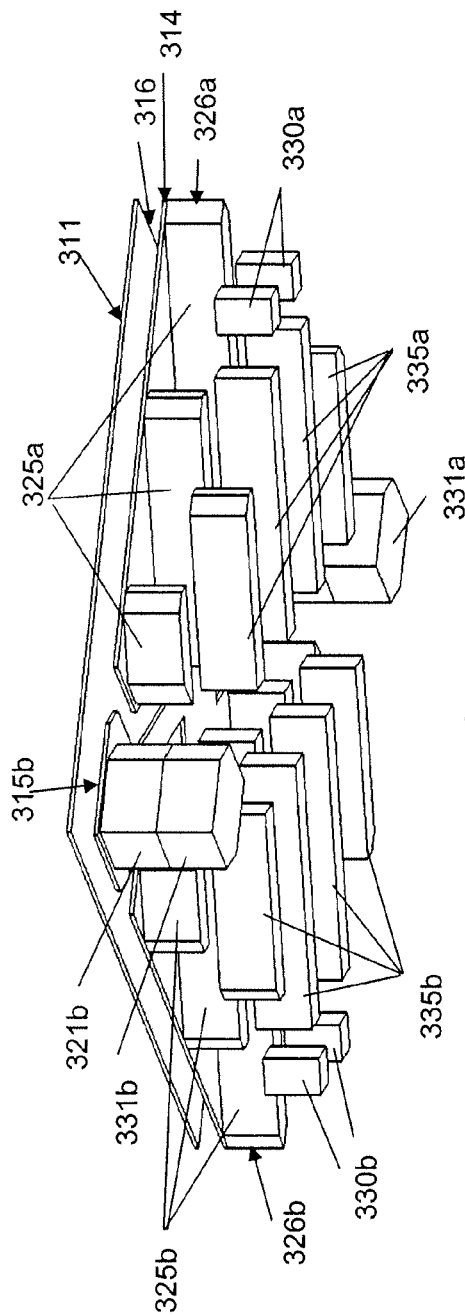
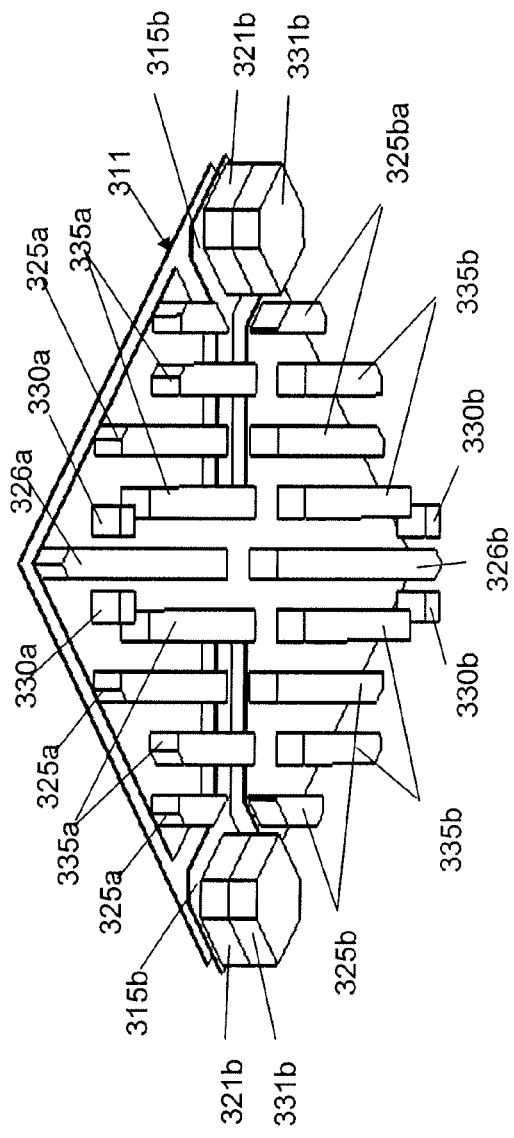
FIG. 6A
FIG. 6B

MICRO MIRRORS HAVING A MIRROR PLATE WITH INTERDIGITATED ARMS

BACKGROUND

The present invention relates to improved micro mirrors and their method of fabrication.

A spatial light modulator (SLM) can be built with an array of tiltable mirror plates. Each mirror plate can be tilted by electrostatic forces to an "on" position and an "off" position. The electrostatic forces can be generated by electric potential differences between a planar electrode on the mirror plate and one or more opposing electrodes underneath the planar electrode on the mirror plate. In the "on" position, a reflective surface of the micro mirror plate can reflect incident light to form an image pixel in a display image. In the "off" position, the micro mirror plate directs incident light away from the display image. Despite the advances in the designs and fabrication of micro mirrors, relatively high voltages are usually required to produce enough electrostatic forces to produce appropriate tilt movements in the mirror plate. High voltages require high voltage drive electronic circuits that add complexity and cost to the devices. In addition, planar and stepped electrode mirror devices generate small electrostatic forces and suffer from adhesion problems when they operate in mechanical contact mode.

SUMMARY

In one general aspect, the present invention relates to a micro mirror device that includes a first hinge supported by a substrate, a mirror plate tiltable around the first hinge and having a first set of arms facing the substrate, a second set of arms on the substrate. The first set of arms and the second set of arms can interdigitate when the mirror plate is tilted. The micro mirror device includes a first lateral guard on the substrate or the mirror plate. The first lateral guard can limit movement of the mirror plate to a position in a first direction substantially parallel to an upper surface of the substrate to prevent the first set of arms from contacting the second set of arms.

In another general aspect, the present invention relates to a method for controlling a tiltable mirror plate. The method includes tilting a mirror plate by an electrostatic torque around a first hinge supported by a substrate, wherein the electrostatic torque is produced by an electric potential between a first set of arms on the underside of the mirror plate and a second set of arms on the substrate, wherein the tilt of the mirror plate can place the first set and second set of arms in interdigitated positions; and limiting movement of the mirror plate in a direction substantially parallel to an upper surface of the substrate with a first lateral guard to prevent the first set of arms from contacting the second set of arms when they are interdigitated.

Implementations of the system may include one or more of the following features. The micro mirror device can further include a second lateral guard on the substrate or the mirror plate. The second lateral guard can limit movement of the mirror plate to a position in a second direction substantially parallel to the upper surface of the substrate to prevent the first set of arms from contacting the second set of arms. The second direction can be substantially opposite to the first direction. The first lateral guard and the second lateral guard can be positioned on two opposing sides of one of the first set of arms when the first set of arms and the second set of arms are in the interdigitated positions when the mirror plate is tilted. The first set of arms and the second set of arms can include an electrically conductive material. The first set of arms can be substantially parallel to each other. The second set of arms can be substantially parallel to each other. The first set of arms can be substantially parallel to the second set of arms. At least one of the first set of arms can be separated from its adjacent arm in the second set of arms by a gap less than 1 micron when the first set of arms and the second set of arms are in the interdigitated positions. The one of the first set of arms and its associated arm in the second set of arms can be separated by a gap less than 500 nanometers when the first set of arms and the second set of arms are in the interdigitated positions. The micro mirror device can further include a second hinge supported by the substrate, wherein the mirror plate is tiltable about an axis defined by the first hinge and the second hinge. The first set of arms and the second set of arms can be substantially perpendicular to the axis defined by the first hinge and the second hinge. The micro mirror device can further include a hinge support post on the substrate and configured to support the first hinge. The mirror plate can include a reflective layer configured to reflect an incident light to different directions when the mirror plate is tilted to different positions. The micro mirror device can further include a controller configured to send voltage signals to the first set of arms on the mirror plate and the second set of arms on the substrate to produce an electrostatic torque on the mirror plate to tilt the mirror plate. The voltage signals can have amplitudes less than 5 volts. The hinge can produce an elastic restoring force when the mirror plate is tilted from an un-tilted position to an "on" position or an "off" position, wherein the electrostatic torque can counteract the elastic restoring force to hold the mirror plate at the "on" position or the "off" position. The mirror plate can be substantially parallel to an upper surface of the substrate when in the un-tilted position. The tilt angle at the "on" position can be up to about 15 degrees relative to an un-tilted position.

Implementations may include one or more of the following advantages. The present specification describes a micro mirror device that can produce high electrostatic torques on tiltable mirror plates. Mirror plates in such a micro-mirror device can be tilted to desirable angles with lower electrostatic voltages than some conventional micro mirrors. These lower driving voltages allow simpler and lower-cost electric circuits for driving the micro mirrors. The present invention allows extension of micromirrors to smaller sizes for given addressing voltages due to higher efficiency of arm actuators compared with planar actuators.

The disclosed micro mirror device is more reliable than some conventional micro-mirror systems by preventing accidental touching and resultant discharging between the opposite electrodes on the mirror plate and on the substrate.

The mirror plate in the disclosed micro mirror device can be tilted to and held at predetermined angles in response to electric signals provided by a controller. No mechanical stop is required for defining the tilt angles of the mirror plate, which allows for a simpler structure in the disclosed micro mirror device and for avoiding static friction ("stiction") between a mirror plate and mechanical stops—a problem in some conventional mirror devices. The device of the invention can also operate with mechanical stop(s) but stiction becomes less of a problem with the disclosed micro mirror device than stiction in conventional devices because much larger restoring torque is available to separate the surfaces from contact.

DESCRIPTION OF DRAWINGS

The following drawings, which are incorporated in and form a part of the specification, illustrate embodiments of the present invention and, together with the description, serve to explain the principles of the invention.

FIGS. 6A and 6B are bottom perspective views of the reflective layer, the hinge layer, the mirror electrodes, and the substrate electrodes.

DETAILED DESCRIPTION

Figure 1:
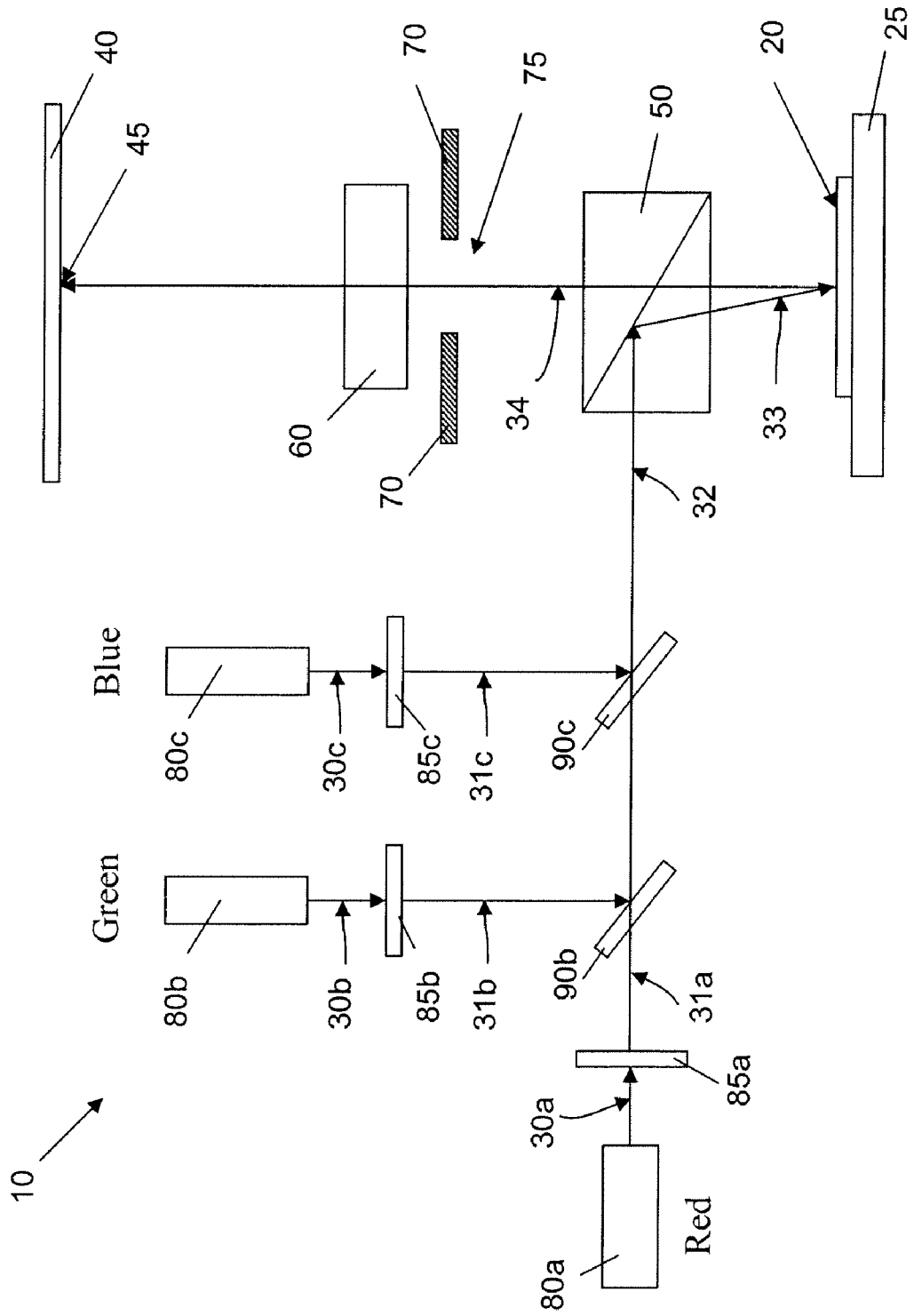
FIG. 1 is a schematic diagram of a display system.

Referring to FIG. 1, a display system 10 includes a spatial light modulator 20 on a support member 25, a total internal reflection (TIR) prism 50, an aperture structure 70 having an opening 75, and a projection system 60. The display system also includes one or more light sources such as red, green, and blue light sources 80a, 80b and 80c, respectively, diffusers 85a, 85b, 85c for the respective red, green and blue light sources and dichroic mirrors 90b and 90c. Exemplified compatible light sources include light emitting diodes, solid-state semiconductor lasers, diode pumped lasers, and ion or gas laser devices. The red, green and blue light sources 80a, 80b and 80c can sequentially emit red, green and blue light beams 30a, 30b and 30c to illuminate the spatial light modulator 20. The sequentially emitted red, green and blue colored light 30a, 30b and 30c respectively pass through diffusers 85a, 85b and 85c. The diffusers 85a, 85b and 85c are configured to resize (e.g., expand) the beam and to form shaped colored lights 31a, 31b, and 31c having cross-sections compatible with the shape of the spatial light modulator 20. For example, for a rectangular shaped spatial light modulator 20, the shaped colored light 31a, 31b and 31c can be shaped by the diffusers 85a, 85b 85c to have rectangular cross-sections compatible with the spatial light modulator 20.

The shaped colored lights 31b and 31c are respectively reflected by dichroic mirrors 90b and 90c, respectively. The dichroic mirrors 90b and 90c also function as beam combiners, which direct the shaped colored lights 31b, 31c into a common path shown as colored light 32. The shaped colored light 31a passes through the dichroic mirror 90b and then travels along the same optical path as the shaped colored lights 31b and 31c after the shaped colored lights 31b and 31c are redirected. The colored light 32 represents one of the shaped colored lights 31a, 31b or 31c at each time interval because the colored lights 30a, 30b or 30c are sequentially emitted. The colored light 32 is reflected by the Total Internal Reflection (TIR) prism 50 to form color incident light 33 which illuminates micro mirrors in the spatial light modulator 20. The color incident light 33 is selectively reflected by the spatial light modulator 20 to form a reflected light beam 34 which passes through the TIR prism 50 and the opening 75 in the aperture structure 70. When the red colored light 30a is emitted, the shaped colored light 31a is red and thus the color incident light 33 are red. The reflected light beam 34 is then projected by the projection system 60 to form a red image on a display surface 40. Similarly, when the green and blue colored lights 30b and 30c are respectively emitted, the color incident light 33 is respectively green and blue. The reflected light beam 34 is projected by the projection system 60 to respectively form a green and blue image on a display surface 40. The red, green and blue display images in combination can produce the visual effect of a color display image that includes a display pixel 45. Alternatively, a white light source coupled with a color wheel can provide sequential color light to the spatial light modulator 20.

Figure 2:
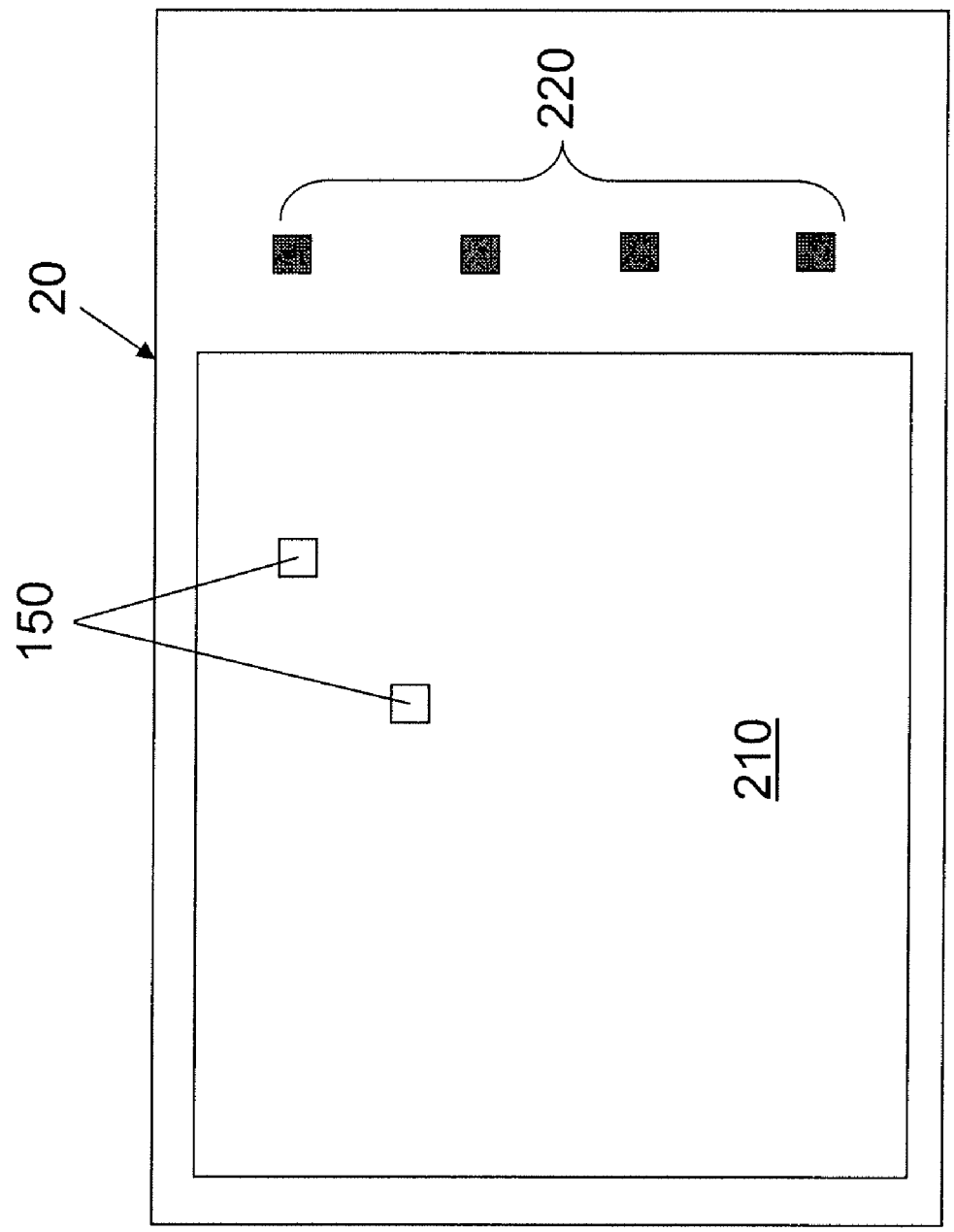
FIG. 2 is a schematic top view of a spatial light modulator compatible with the display system of FIG. 1.

The spatial light modulator 20, as shown in FIG. 2, can include an array 210 of pixel cells 150, each comprising an electro-optical device. Electrical terminals 220 adjacent to the array 210 can receive control electrical signals for addressing and controlling the electro-optical devices at the pixel cells 150.

Figure 3:
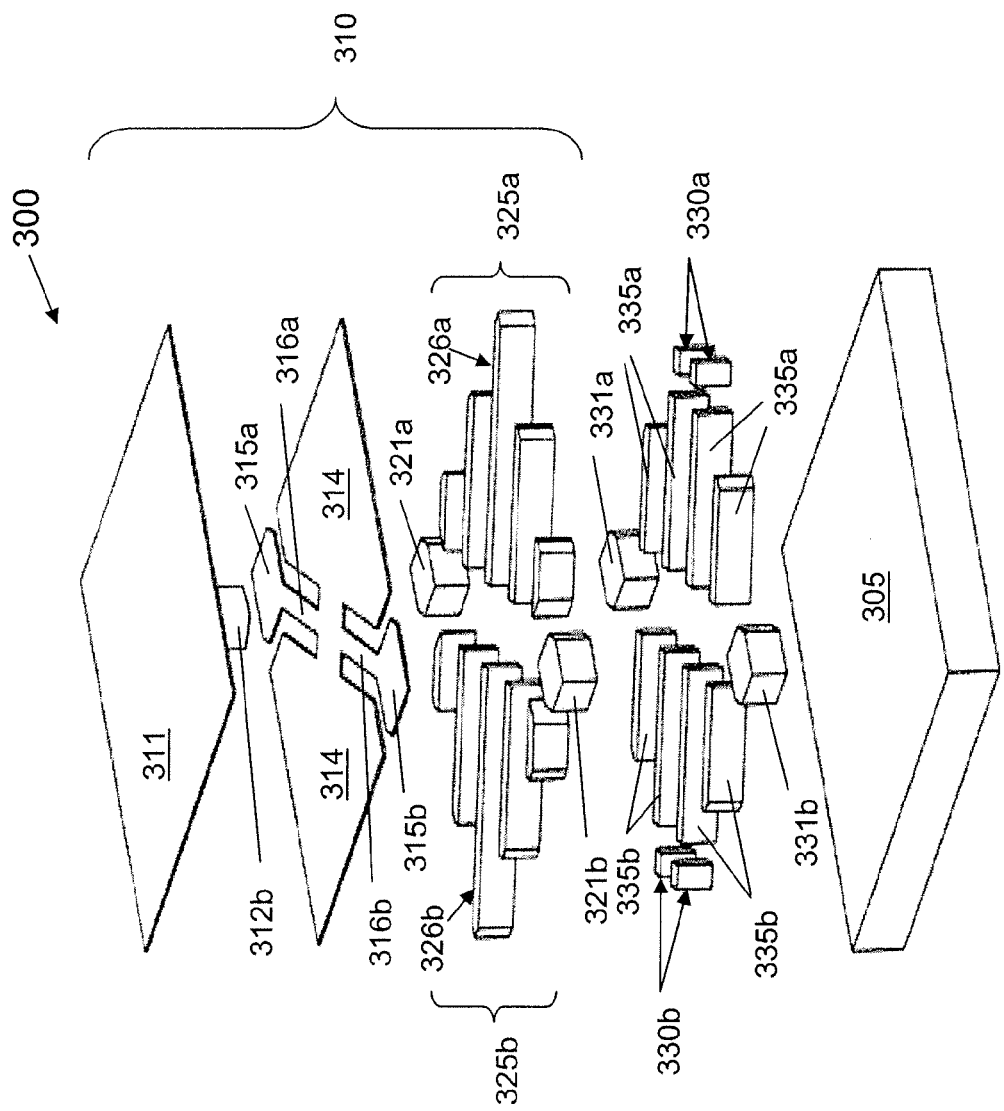
FIG. 3 is an exploded perspective view of a partial set of components in a micro mirror compatible with the spatial light modulator of FIG. 2.
Figure 4:
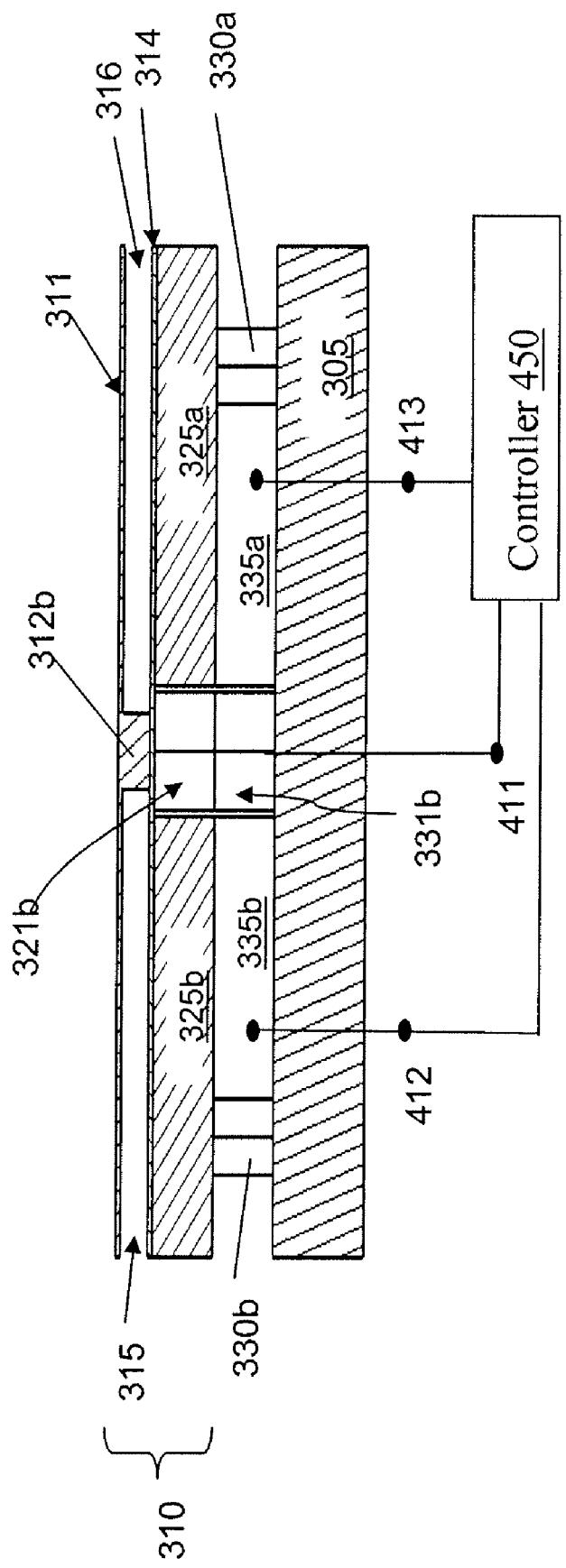
FIG. 4 is a front cross-sectional view of the micro mirror.
Figure 5:
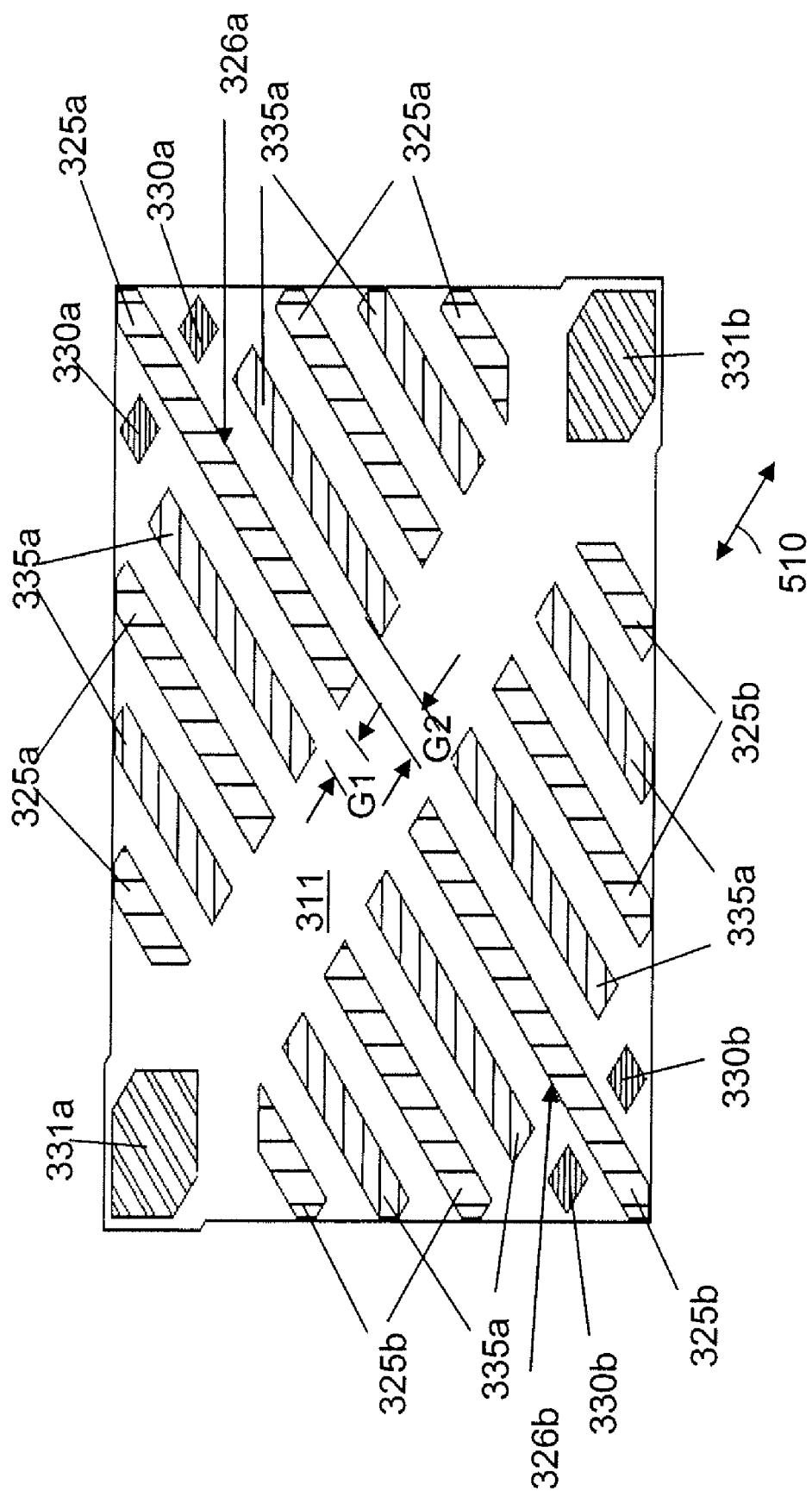
FIG. 5 is a bottom view of the substrate electrodes, the mirror electrodes, and the reflective layer.

Referring to FIGS. 3 and 4, an exemplified pixel cell 150 (shown in FIG. 2) can include a tiltable micro mirror 300. The micro mirror 300 can include a mirror plate 310 supported by hinge support posts 331a and 331b over a substrate 305. The mirror plate 310 includes a reflective layer 311, a hinge connector 312b shown in FIGS. 3 and 4, a hinge layer 314, and a plurality of mirror electrodes 325a and 325b on the underside of the hinge layer 314. The reflective layer can be formed of aluminum or other reflective metal or metal alloy. The hinge layer 314 can be formed of a metallic material such as aluminum, titanium, or an AlTi or AlTiN alloy or doped semiconductors such as silicon or silicon-germanium. The mirror plate 310 can have a rectangular or square shape with a side in a range from 2 to 50 microns. The hinge layer 314 includes two hinge components 315a and 315b connected with the main portion of the hinge layer 314 respectively by elongated hinges 316a and 316b. The reflective layer 311 is connected to the hinge components 315a and 315b and 316a and 316b by the hinge connector 312b. The rest of the reflective layer 311 is separated from the hinge layer 314 by gaps 315 and 316. The hinge components 315a and 315b are also respectively connected to hinge connectors 321a and 321b, which are in turn respectively connected to the hinge support posts 331a and 331b on the substrate 305. The hinge support posts 331a and 331b, the hinge connectors 321a and 321b, the hinge layer 314, and the mirror electrodes 325a and 325b are electrically conductive. The hinge support posts 331a and 331b are electrically connected with an electrode 411 (FIG. 4). The mirror electrodes 325a and 325b are electrically connected and have the same electric potential. A controller 450 (FIG. 4) can send a voltage signal to the electrode 411 to set the voltage of the mirror electrodes 325a and 325b.

The micro mirror 300 also includes two sets of substrate electrodes 335a and 335b on the substrate 305 and respectively under the mirror electrodes 325a and 325b. The substrate electrodes 335a and 335b are respectively connected to electrical leads 412 and 413 (FIG. 4). The voltages of the substrate electrodes 335a and 335b can be individually controlled by the controller 450 via electrical leads 412 and 413, respectively.

Referring to FIGS. 3-5, 6A, and 6B (the hinge layer 314 is not shown in FIG. 5 for viewing clarity), the mirror electrodes 325*a* and 325*b* are formed by a plurality of arms separated by air gaps. The arms can be parallel within their respective electrodes. For example, the mirror electrodes 325*a* and 325*b* include arms 326*a* and 326*b*. The substrate electrodes 335*a* and 335*b* also include a plurality of arms, preferably parallel, that are respectively positioned under the air gaps formed between the arms in the mirror electrodes 325*a* and 235*b*, respectively. In other words, the mirror electrodes 325*a*, 325*b* and the substrate electrodes 335*a*, 335*b* are disposed in staggered positions. The mirror electrodes 325*a*, 325*b* are electrically connected to the hinge layer 314, which is in turn electrically connected to hinge support connectors 321*a* and 321*b* and to hinge support posts 331*a* and 331*b*. Those electrodes and connectors are in turn connected to the electrical lead 411 and to the controller 450, all as shown in FIGS. 3-5, 6A and 6B.

Figure 7A:
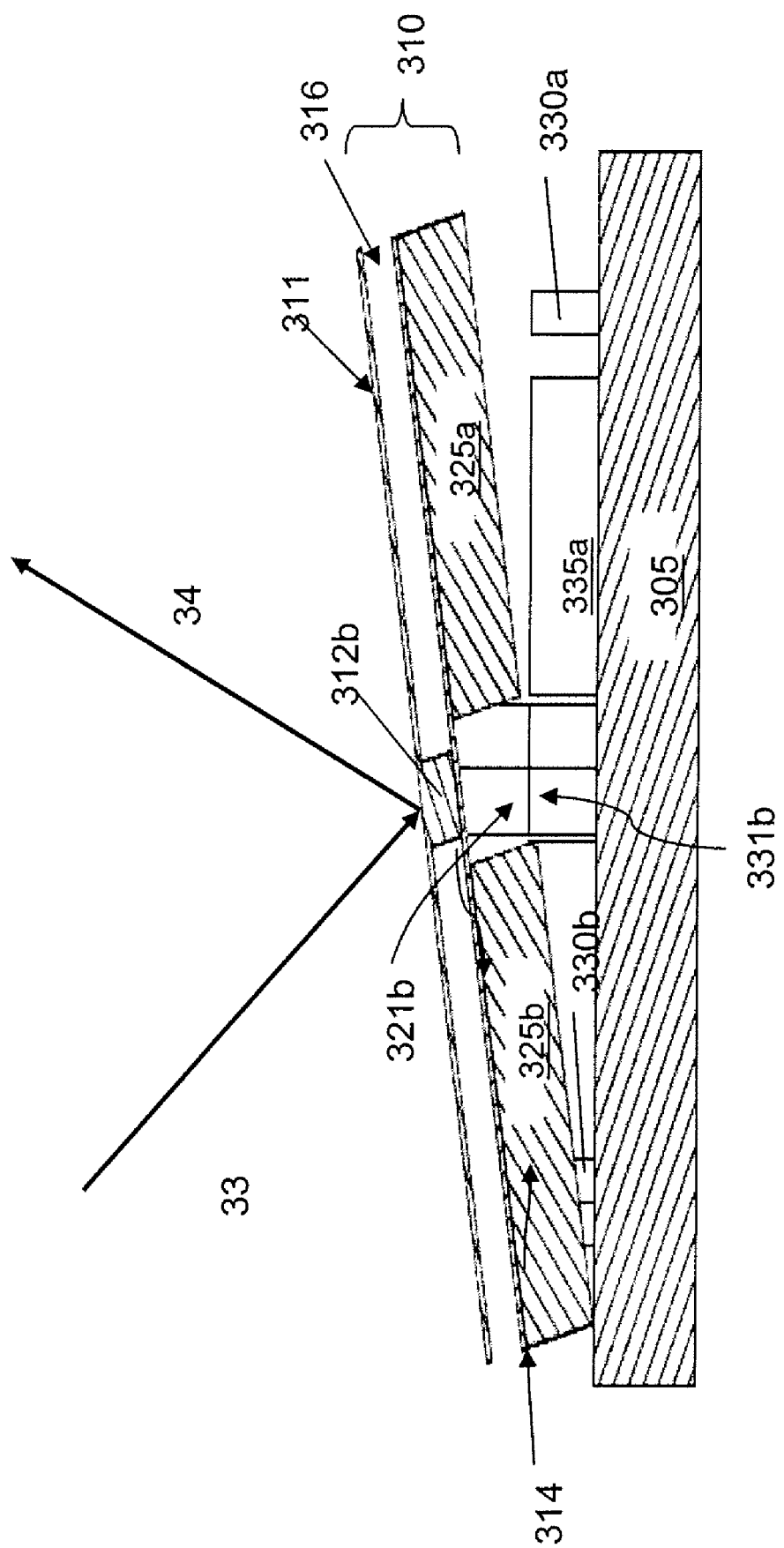
FIG. 7A is a front cross-sectional view of the micro mirror showing the mirror plate at a tilted position and the reflection of incident light by the tilted mirror plate.
Figure 7B:
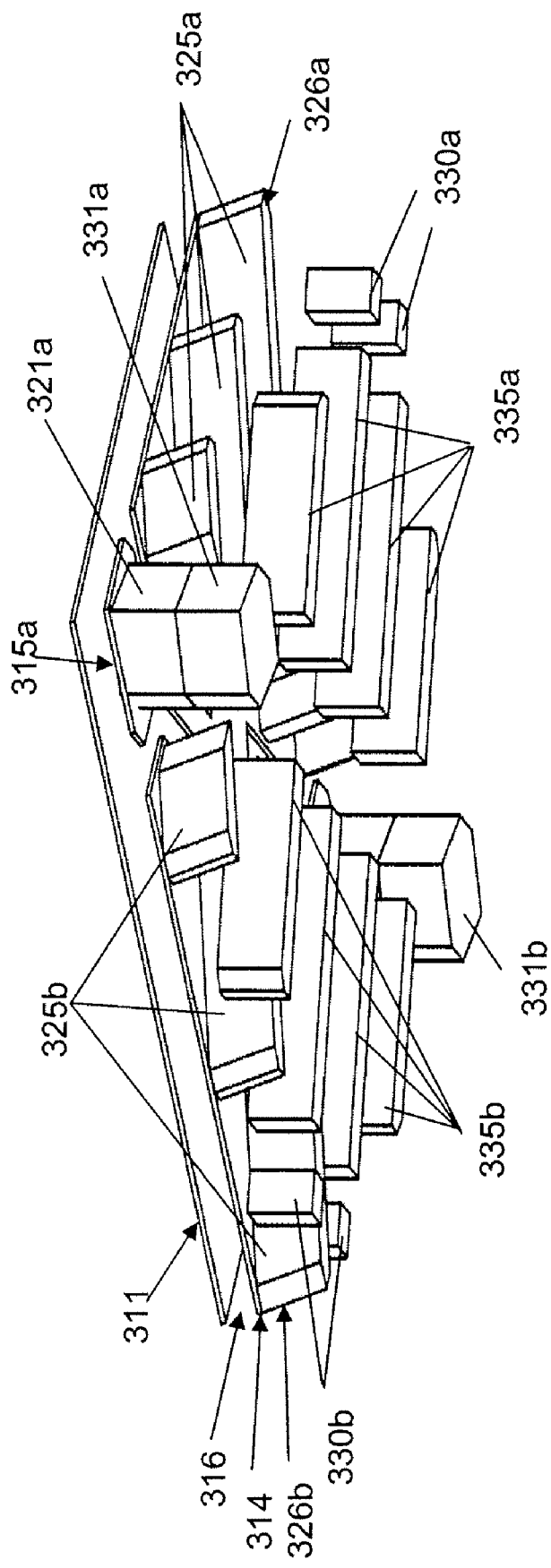
FIG. 7B is a bottom perspective view of the reflective layer, the hinge layer, the mirror electrodes and the substrate electrodes in their interdigitated positions when the mirror plate is in a tilted position.

Referring to FIGS. 4, 7A, and 7B, the controller 450 can send voltage signals to electrical leads 411, 412, 413 to produce appropriate voltages at the mirror electrodes 325*a*, 325*b* and the substrate electrodes 335*a* and 335*b*. For example, the mirror electrodes 325*a*, 325*b* can be set to a positive voltage; the substrate electrode 335*a* is set to the same positive voltage and the substrate electrode 335*b* to a ground, which results in no force on one side (the right side in FIGS. 7A and 7B) of the mirror plate 310 and an attractive force on the other side (the left side in FIGS. 7A and 7B) of the mirror plate 310. The mirror plate 310 is tilted about an axis defined by the hinge components 315*a* and 315*b* (FIG. 3) to the left side. The staggered positions of the mirror electrodes 325*a*, 325*b* and the substrate electrodes 335*a*, 335*b* allow the arms in the mirror electrodes 325*a*, 325*b* to move into the air gaps between the arms of the substrate electrodes 335*a*, 335*b* (FIG. 7B). The substrate electrodes 335*a*, 335*b* form alternating or interdigitated positions in a plane parallel to the upper surface of the substrate 305.

The tilt position of the mirror plate 310 twists the hinges 316*a* or 316*b* (shown in FIG. 3), which produce elastic restoring forces to balance the electrostatic torque. As a result, the mirror plate 310 is held at predetermined tilt angle (e.g., at an "on" or an "off" position). The color incident light 33 is reflected by the reflective layer 311 to form the reflected light beam 34 traveling toward a display surface 40 (FIG. 1). When the voltage signals are removed, the elastic restoring forces can tilt the mirror plate 310 back to an un-tilted position that is typically parallel to the upper surface of the substrate 305. The mirror plate 310 can be tilted from an un-tilted position to an "on" position or an "off" position, wherein the reflective layer 311 can reflect the incident light in different directions.

An advantage of the above micro mirror is that the staggered configurations between the arms allow closer distance between the surface electrodes and the substrate electrodes, and also creates larger surface areas of electrodes which result in stronger electrostatic torques compared to conventional systems. For example, the disclosed micro mirror can tilt the mirror plate 310 up to about 15 degrees using driving voltages with amplitudes below 5 Volts at the electrical leads 411-413, which is significantly lower than some conventional mirror systems. The lower driving voltage allows simpler electronic circuitry in the design and fabrication of the controller 450.

Another advantage of the disclosed micro mirror is that it does not need to employ mechanical stops for stopping the tilt of the mirror plate or to define the mirror plate's tilt angle. Although lateral guards 330*a* and 330*b* are used to prevent the mirror from undergoing excessive lateral displacement, as will be described below, these lateral guards are not used for defining mirror tilt during normal, stable conditions. Instead, the tilt angle is defined by a balance between an externally produced electrostatic torque and an elastic restoring force by the twisted hinges. The elimination of the tilt mechanical stops simplifies the micro mirror structure and removes the problem of stiction between the mirror plate and the mechanical stop in some conventional systems. Alternatively, the mirror plate can be stopped mechanically on the substrate 305 in order to define uniform deflection angles of different mirror plates. In such a case, contact areas are electrically kept at the same electrostatic potential as the mirror plate.

In cases where stiction between the mirror plate and the substrate electrical contacts does occur, the mechanical restoring torque is much higher in the disclosed device than in conventional plate devices, and the mirror plate is easily removed from the mechanical contact when the driving voltages are removed. Furthermore, an anti-stiction coating can be included, particularly in areas where the mirror makes mechanical contact, to provide more reliable making and breaking of the mechanical contact.

A failure mode discovered in the above disclosed electrode structure is that the arms in the mirror electrode 325*a* or 325*b* may contact one or more arms in the substrate electrodes 335*a* or 335*b* during the tilt of the mirror plate 310, which can cause the discharge between the electrodes, shorting of the electric circuit in the controller 450, and malfunction of the micro mirror device. Referring now to FIGS. 4, 5, 7A, and 7B, the gaps "G1" and "G2" (FIG. 5) between adjacent arms in the mirror electrode 325*a* and the substrate electrodes 335*a* can be as small as 50-500 nanometers when they are interdigitated. Mechanical instability of the mirror plate 310 during its tilt movement can cause the mirror plate 310 to displace along a lateral direction 510 (FIG. 5) parallel to the upper surface of the substrate 305.

Electromechanical instability can occur because gaps G1 and G2 are not exactly equal and the sideway motion can take place in the direction 510 when the critical voltage difference is exceeded. Mechanical instability can occur, for example, in a projection system employing a micro-mirror spatial light modulator, when there is vibration in the support (e.g., table) for the spatial light modulator, or as a result of the rotation of the cooling fan in the projection system. In such circumstances, when the arms are interdigitated, the arms in the mirror electrode 325*a* or 325*b* can come into contact with one or more arms in the substrate electrodes 335*a* or 335*b*.

An advantageous feature of the disclosed micro mirror is that lateral guards 330*a* and 330*b* are constructed on the substrate 305 to overcome the above described problem. The lateral guards 330*a* and 330*b* are not electrically connected to any of the substrate electrodes 335*a* or 335*b* but are connected electrically to the mirror plate electrodes. A pair of lateral guards 330*a* is positioned such that they are on the two sides 326*a* of the arm in the mirror electrode 325*a* when the mirror plate 310 is tilted toward the substrate electrode 335*a*. When electromechanical or mechanical instability causes the mirror plate 310 to move laterally in the direction 510, the lateral guards 330*a* can come to contact with the arm 326*a* to limit the range of relative movement between the mirror electrodes 325*a* or 325*b* and the substrate electrodes 335*a* or 335*b*. Thus these lateral guards 330*a* prevent the contact and electric discharge between the mirror electrodes 325*a* or 325*b* and the substrate electrodes 335*a* or 335*b*. Similarly, a pair of lateral guards 330*b* are positioned on the two sides of the arm 326*b* in the mirror electrode 325*a* to prevent the contact and electric discharge between the mirror electrodes 325*a* or 325*b* and the substrate electrodes 335*a* or 335*b*.

It should be noted that in the normal operation of the mirror plate, when there is no electromechanical or mechanical instability, the micro mirror is designed such that the mirror electrodes do not contact the lateral guards. The mirror electrodes only touch the lateral guards in the rare event when instability causes a relatively large lateral movement (in the direction 510) of the mirror plate.

It is understood that the disclosed methods are compatible with other configurations without deviating from the spirit of the disclosed inventions. For example, the substrate electrodes and the mirror electrodes can be located in different relative positions. The lateral guards can be positioned aside a different arms of the substrate electrodes. The lateral guards also can be disposed on the mirror plate (instead of on the substrate) to guard the movement of the mirror plate relative to the substrate electrodes. The hinge component, hinge connection post, hinge support post, mirror and substrate electrodes can all have various geometries. The reflective layer can have other shapes than described above.

What is claimed is:

1. A micro mirror device, comprising:
    a first hinge supported by a substrate;
    a mirror plate tiltable around the first hinge and having a first set of arms facing the substrate;
    a second set of arms on the substrate, wherein the first set of arms and the second set of arms are configured to interdigitate when the mirror plate is tilted; and
    a first lateral guard on the substrate or the mirror plate, wherein the first lateral guard is configured to limit movement of the mirror plate to a position in a first direction substantially parallel to an upper surface of the substrate to prevent the first set of arms from contacting the second set of arms when they are interdigitated.

2. The micro mirror device of claim 1, further comprising a second lateral guard on the substrate or the mirror plate, wherein the second lateral guard is configured to limit movement of the mirror plate to a position in a second direction substantially parallel to the upper surface of the substrate to prevent the first set of arms from contacting the second set of arms when they are interdigitated.

3. The micro mirror device of claim 2, wherein the second direction is substantially opposite to the first direction.

4. The micro mirror device of claim 2, wherein the first lateral guard and the second lateral guard are positioned on two opposing sides of one of the first set of arms when the first set of arms and the second set of arms are in the interdigitated positions when the mirror plate is tilted.

5. The micro mirror device of claim 1, wherein the first set of arms and the second set of arms comprise an electrically conductive material.

6. The micro mirror device of claim 1, wherein the first set of arms is substantially parallel to each other.

7. The micro mirror device of claim 6, wherein the second set of arms is substantially parallel to each other.

8. The micro mirror device of claim 1, wherein the first set of arms is substantially parallel to the second set of arms.

9. The micro mirror device of claim 1, wherein at least one of the first set of arms is separated from its adjacent arm in the second set of arms by a gap less than 1 micron when the first set of arms and the second set of arms are in the interdigitated positions.

10. The micro mirror device of claim 9, wherein the one of the first set of arms and its associated arm in the second set of arms are separated by a gap less than 500 nanometers when the first set of arms and the second set of arms are in the interdigitated positions.

11. The micro mirror device of claim 1, further comprising a second hinge supported by the substrate, wherein the mirror plate is tiltable about an axis defined by the first hinge and the second hinge.

12. The micro mirror device of claim 11, wherein the first set of arms and the second set of arms are substantially perpendicular to the axis defined by the first hinge and the second hinge.

13. The micro mirror device of claim 1, further comprising a hinge support post on the substrate and configured to support the first hinge.

14. The micro mirror device of claim 1, wherein the mirror plate comprises a reflective layer configured to reflect an incident light to different directions when the mirror plate is tilted to different positions.

15. The micro mirror device of claim 1, further comprising a controller configured to send voltage signals to the first set of arms on the mirror plate and the second set of arms on the substrate to produce an electrostatic torque on the mirror plate to tilt the mirror plate.

16. The micro mirror device of claim 15, wherein the voltage signals have amplitudes less than 5 volts.

17. The micro mirror device of claim 15, wherein the hinge is configured to produce an elastic restoring force when the mirror plate is tilted from an un-tilted position to an "on" position or an "off" position, wherein the electrostatic torque is configured to counteract the elastic restoring force to hold the mirror plate at the "on" position or the "off" position.

18. The micro mirror device of claim 17, wherein the mirror plate is substantially parallel to an upper surface of the substrate when in the un-tilted position.

19. The micro mirror device of claim 1, wherein the tilt angle at the "on" position is up to about 15 degrees relative to an un-tilted position.

20. A method for controlling a tiltable mirror plate, comprising:
    tilting a mirror plate by an electrostatic torque around a first hinge supported by a substrate, wherein the electrostatic torque is produced by an electric potential between a first set of arms on the underside of the mirror plate and a second set of arms on the substrate, wherein the tilt of the mirror plate places the first set and second set of arms in interdigitated positions; and
    limiting movement of the mirror plate in a direction substantially parallel to an upper surface of the substrate with a first lateral guard to prevent the first set of arms from contacting the second set of arms when the arms are in the interdigitated position.

21. The method of claim 20, further comprising limiting the movement of the mirror plate in a second direction substantially parallel to the upper surface of the substrate with a second lateral guard to prevent the first set of arms from contacting the second set of arms when the arms are in the interdigitated position.

22. The method of claim 21, wherein the second direction is substantially opposite to the first direction.

23. The method of claim 20, further comprising reflecting an incident light with a reflective layer in the mirror plate to different directions when the mirror plate is tilted to different positions.

24. The method of claim 20, further comprising sending voltage signals to the first set of arms on the mirror plate and the second set of arms on the substrate to produce the electrostatic torque on the mirror plate to tilt the mirror plate.

25. The method of claim 24, wherein the voltage signals have amplitudes less than about 5 volts.

26. The method of claim 20, further comprising:
    producing an elastic restoring force by the hinge when the mirror plate is tilted from the un-tilted position to an "on" position or an "off" position; and countering the electrostatic torque by the elastic restoring force to hold the mirror plate at the "on" position or the "off" position.

27. The method of claim 26, wherein the tilt angle at the "on" position is up to about 15 degrees relative to the un-tilted position.

28. The method of claim 26, further comprising:
reducing or removing the electrostatic torque; and
elastically restoring the mirror plate to the un-tilted position after the electrostatic force has been reduced or removed.

29. The method of claim 20, wherein the mirror plate is substantially parallel to an upper surface of the substrate when in the un-tilted position.

30. The method of claim 26 wherein the mirror makes no mechanical stop when tilted either in the "on" or the "off" position.

31. The method of claim 26 wherein the mirror makes a mechanical stop when tilted in the "on" or the "off" position.

32. The micro mirror device of claim 1 having an anti-stiction coating in areas where the mirror makes contact during a mechanical stop.

33. A display system, comprising:
a light source configured to emit a coherent light beam;
an optical component configured to direct the light beam to a spatial light modulator, the spatial light modulator comprising:
a two-dimensional array of mirrors on a mirror plate, each mirror configured to selectively reflect the light beam either toward a display surface or away from the display surface to form a display pixel on the display surface, wherein a display image is formed on the display surface by display pixels produced by the mirrors that reflect the coherent light beam toward the display surface;
a first hinge supported by a substrate;
the mirror plate being tiltable around the first hinge and having a first set of arms facing the substrate;
a second set of arms on the substrate, wherein the first set of arms and the second set of arms are configured to interdigitate when the mirror plate is tilted; and
a first lateral guard on the substrate or the mirror plate, wherein the first lateral guard is configured to limit movement of the mirror plate to a position in a first direction substantially parallel to an upper surface of the substrate to prevent the first set of arms from contacting the second set of arms when they are interdigitated.

* * * * *